Aug. 18, 1964    R. A. WOODSON    3,145,251
INTERFEROMETERS
Filed Oct. 7, 1959    9 Sheets-Sheet 2

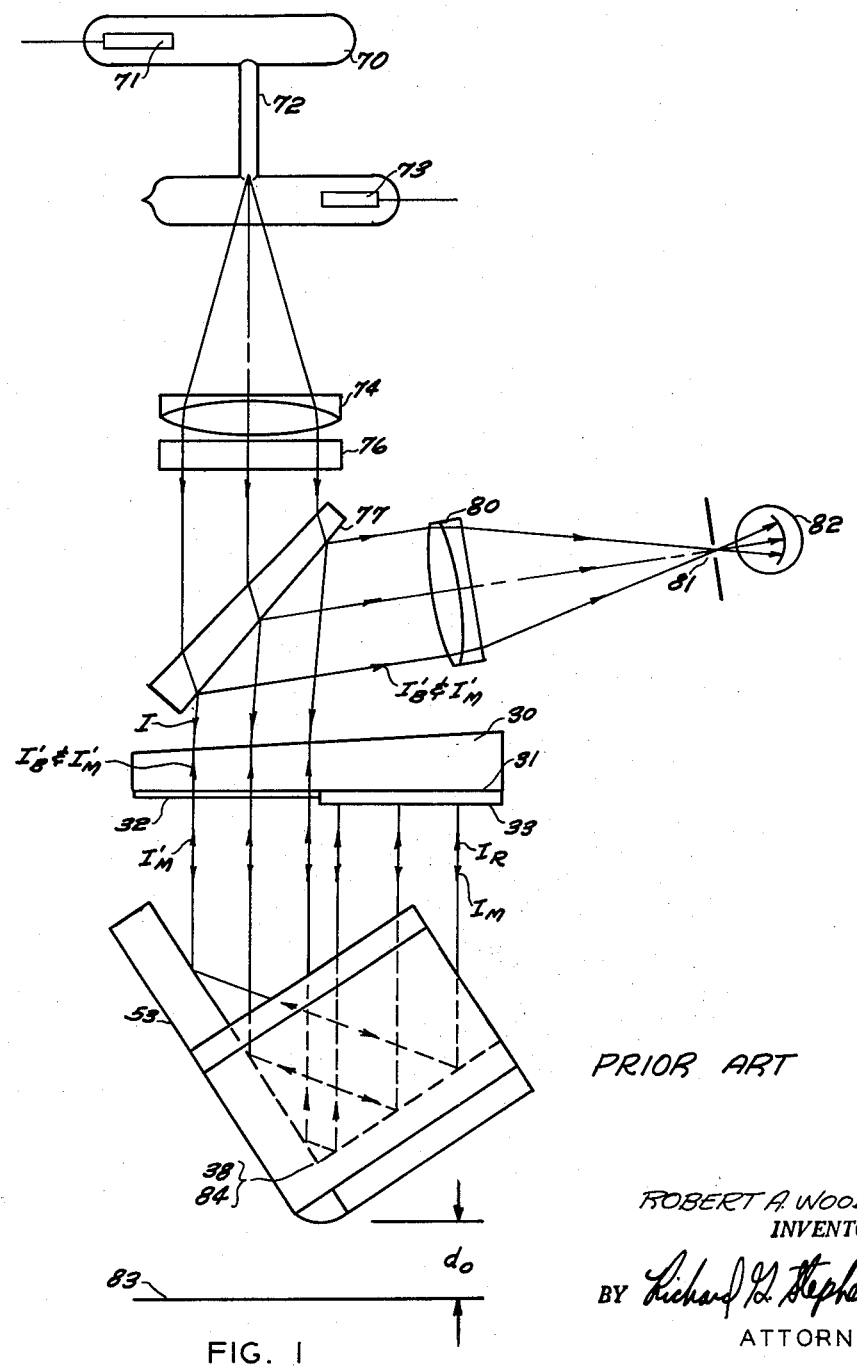

ROBERT A. WOODSON
INVENTOR
BY *Richard L. Stephens*
ATTORNEY

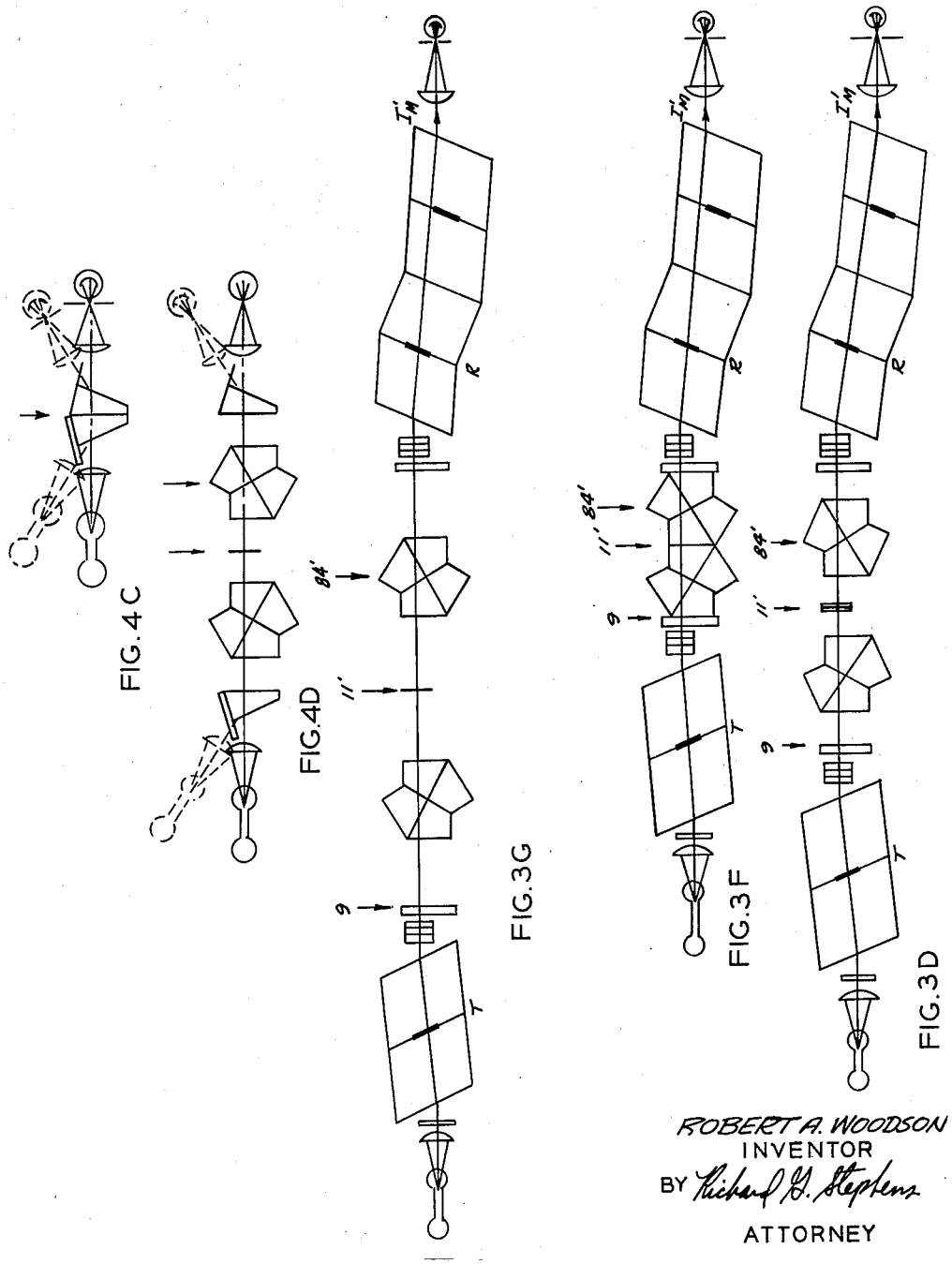

Aug. 18, 1964  R. A. WOODSON  3,145,251
INTERFEROMETERS
Filed Oct. 7, 1959  9 Sheets-Sheet 4
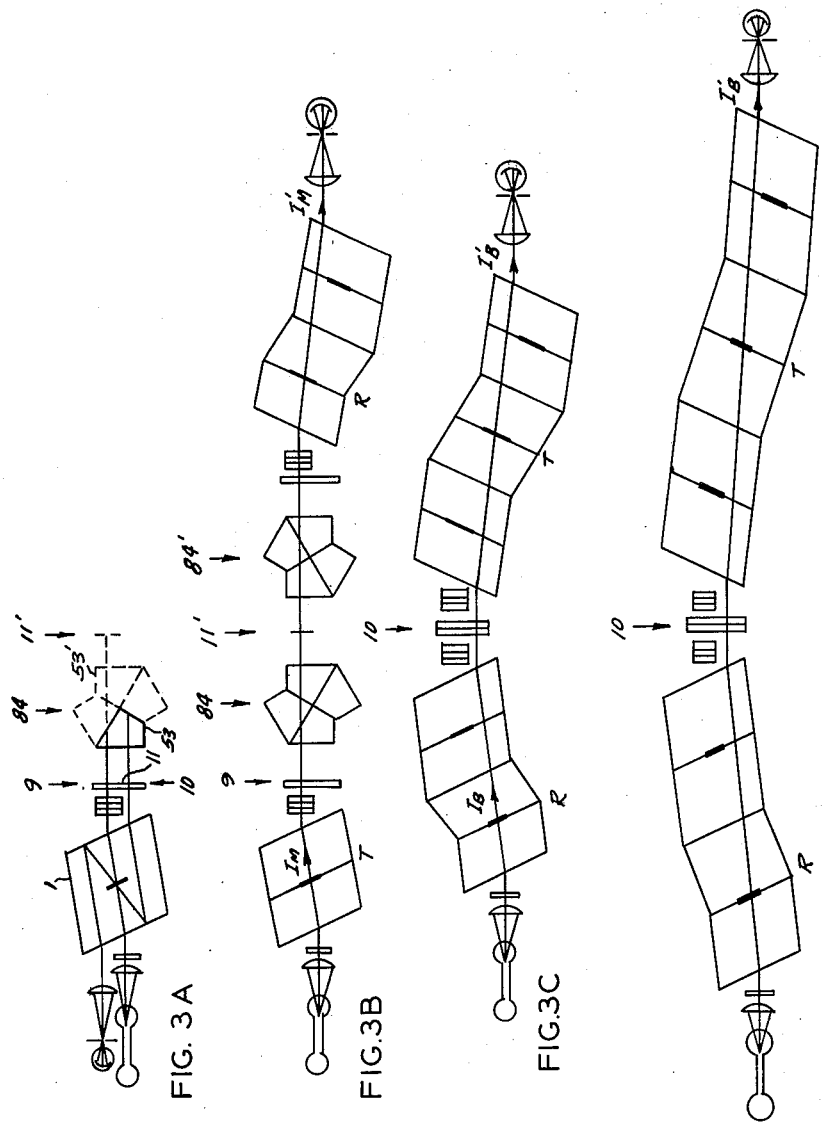
ROBERT A. WOODSON
INVENTOR
BY *Richard G. Stephens*
ATTORNEY Aug. 18, 1964  R. A. WOODSON  3,145,251
INTERFEROMETERS Filed Oct. 7, 1959  9 Sheets-Sheet 5

ROBERT A. WOODSON
INVENTOR

BY *Richard D. Stephens*
ATTORNEY

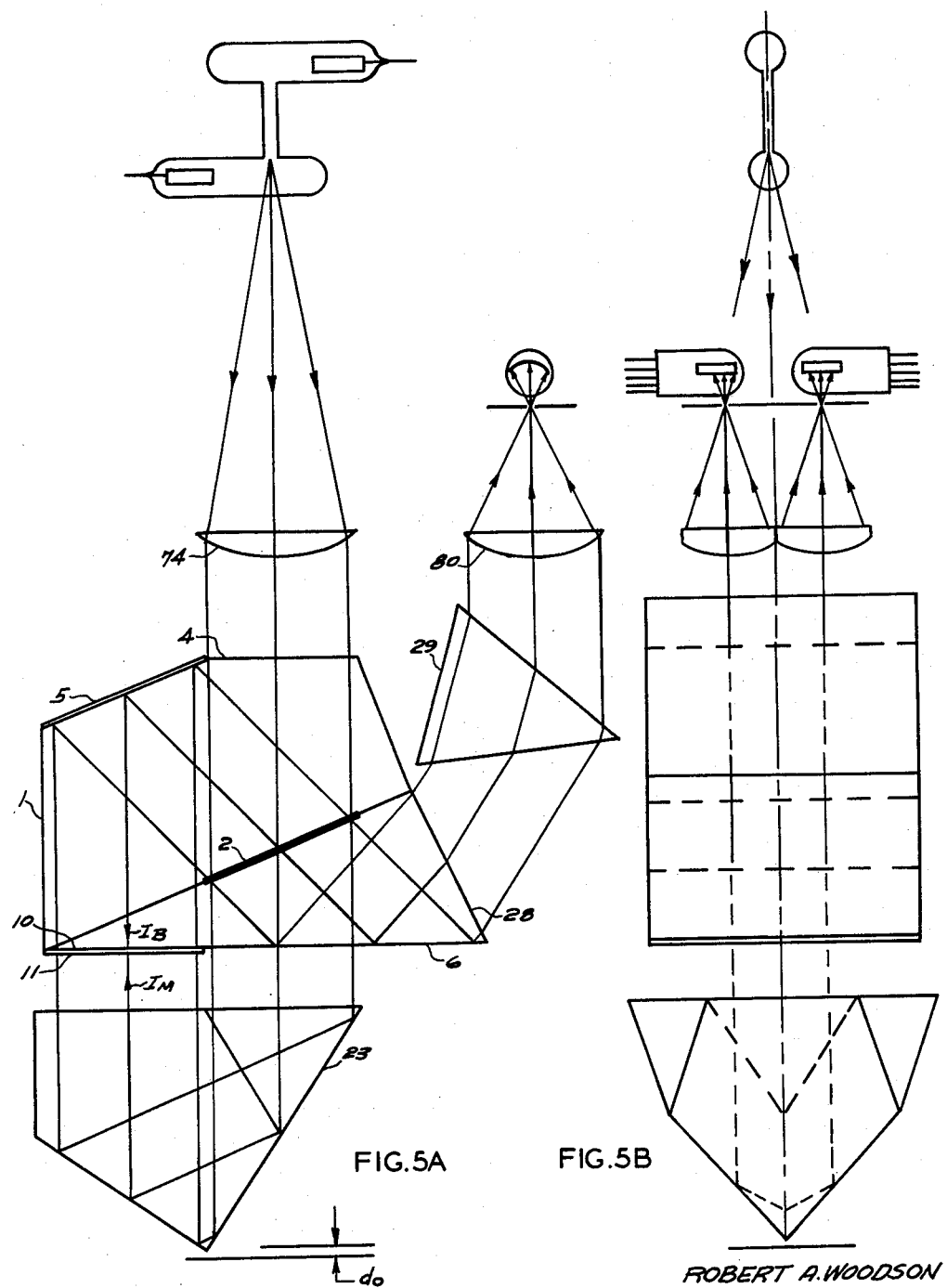

ROBERT A. WOODSON
INVENTOR

BY
ATTORNEY

United States Patent Office 3,145,251
Patented Aug. 18, 1964

1

3,145,251
INTERFEROMETERS
Robert A. Woodson, Vestal, N.Y., assignor to Link Aviation, Inc., Binghamton, N.Y., a corporation of New York
Filed Oct. 7, 1959, Ser. No. 845,031
7 Claims. (Cl. 88—14)

The primary purpose of this invention is to provide an extremely precise instrument that is specifically designed to measure the distance of a test point from a reference plane. This measurement is to be in terms of the wavelength of light so that a numerical fringe count is directly proportional to the normal component of the motion of the test point (with respect to the reference plane) regardless of the possible presence of other components in its motion.

The test point may be located on a movable member in such a way that the fringe count is independent of the orientation of the movable member about any axis. The principal improvement of this invention over the below cited predecessor invention consists of providing for more than twice the useful measuring range magnitude. Another improvement makes the dispersing prism integral with the reference path prism.

A secondary purpose of this invention is to provide an interferometer that is extremely stable so that the fringe count is entirely independent of the orientation of any movable member.

A third purpose of this invention is to provide a versatile laboratory or inspection type of test interferometer to measure the abberations of a supposedly parallel plate, to measure the deviation angle of a wedge, to measure the abberations of cube corner prisms and other retro-reflectors, to measure the angle of rotation of a reflector, and to measure other properties capable of being evaluated in an interferometer.

Other objects of the invention will in part be obvious and will in part appear hereinafter.

The invention accordingly comprises the features of construction, combinations of elements, and arrangement of parts, which will be exemplified in the constructions hereinafter set forth, and the scope of the invention will be indicated in the claims.

For a fuller understanding of the nature and objects of the invention reference should be had to the following detailed description taken in connection with the accompanying drawings, in which:

FIG. 1 is a diagram illustrating the Woodson interferometer of prior copending application Ser. No. 769,736;

FIGS. 3a–3g are optical tunnel diagrams helpful in understanding operation of the device of FIGS. 2a and 2b;

FIGS. 4a and 4b are front and side views of an improved interferometer incorporating refracting surfaces on the beam-splitter component that provide for dispersing the radiation, so that the selected standard measuring wavelength can be counted uniquely, while FIGS. 4c and 4d are optical tunnel diagrams showing the dispersing refracting surfaces;

FIGS. 5a and 5b are front and side views of an improved interferometer incorporating the improvements of both FIGS. 2 and 4;

Figure 2A:
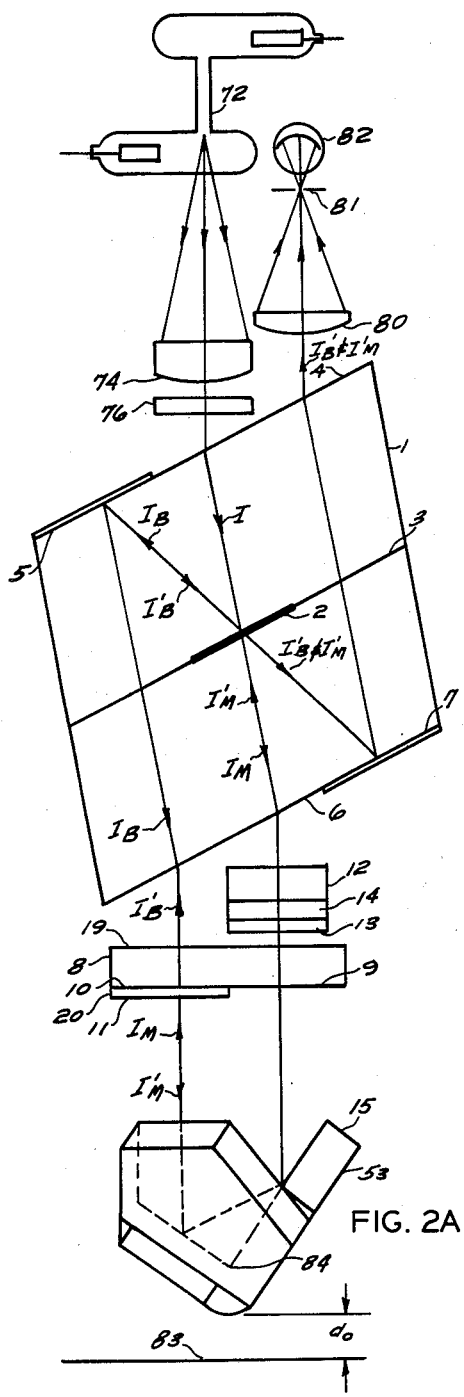
FIGS. 2a and 2b are front and side views illustrating an improved interferometer having an additional optical path length in the reference arm of the interferometer, so that the order of interference may be either positive or negative.

FIGS. 6a and 6b, 7a and 7b and 8a and 8b each are front and side views respectively, of three alternative embodiments of the invention.

2

The cited predecessor invention is described in U.S. patent application Ser. No. 769,736, filed October 27, 1958, and assigned to the same assignee as the present invention. Pertinent prior art is referenced in application Serial No. 769,736.

The accompanying FIG. 1 is a composite reproduction of two figures of application Serial No. 769,736, "Improved Interferometer for Measuring Distances Normal to a Plane," also known as the "Woodson Interferometer." Particular note should be taken of the interference filter 76 for selecting the standard measuring wavelength so that it can be counted uniquely with the electronic fringe counter (not shown). Also particular note should be taken of the bifacial reflector 30 which serves as the special type of end reflector for both interfering beams. On different parts of the face 31 are located the beam splitter 32 and the front surface mirror 33. The beamsplitter 32 serves for splitting the two interfering beams, for reflecting one of the interfering beams (as end reflector), and for recombining the two interfering beams.

In the predecessor invention the path length of one of the interfering beams, as measured from beam splitting to beam recombining, is essentially zero. The corresponding path length of the other interfering beam, measured from beam splitting to beam recombining, is always some positive value greater than a determinable minimum value. Accordingly, the order of interference of the predecessor invention is restricted to a range of positive values, not including small values.

It should be noted (as stated in application Serial No. 769,736) that the possible range of the order of interference is more restricted in application Serial No. 769,736 than in the Michelson type of interferometer, since in application Serial No. 769,736 the order $m$ can never become negative, nor can it become smaller than a minimum which is given by $m_{\min}$. The value of $m_{\min}$ may be expressed in the following equation:

$$m_{\min} = 4m_r$$

where $m_r$ is the minimum number of radiation wavelengths between the mirror 33 (see FIG. 1) and the lower optical extremity 38/84 of the retroreflector 53, this occurring when 53 is as close as possible to the front surface mirror 33.

Another disadvantage of the prior art is its requirement for separate means for dispersing the radiant energy to select the spectral line that is to be used as the standard of length. This dispersion may be produced by a transmission interference filter 76 (see FIG. 1) or perhaps by a dispersion prism that takes the place of the interference filter 76 at its indicated position or between the beamsplitter 77 and the stigmating lens 80.

Two principal improvements which distinguish the present from the predecessor invention (application Serial No. 769,736) are (1) the provision of additional optical path length in the reference arm of the interferometer so that the order of interference may be either positive or negative instead of being restricted to a range of positive values not including small values, and (2) the incorporation of refracting surfaces on the beamsplitter component that provide for dispersing the radiation so that the selected standard measuring wavelength can be counted uniquely.

The first improvement may be used without the second as illustrated in FIGURE 2. FIGURE 3 presents the Optical Tunnel Diagrams for the system shown in FIGURE 2. These Optical Tunnel Diagrams show configurations for both positive and negative orders of interference.

Figure 4A:
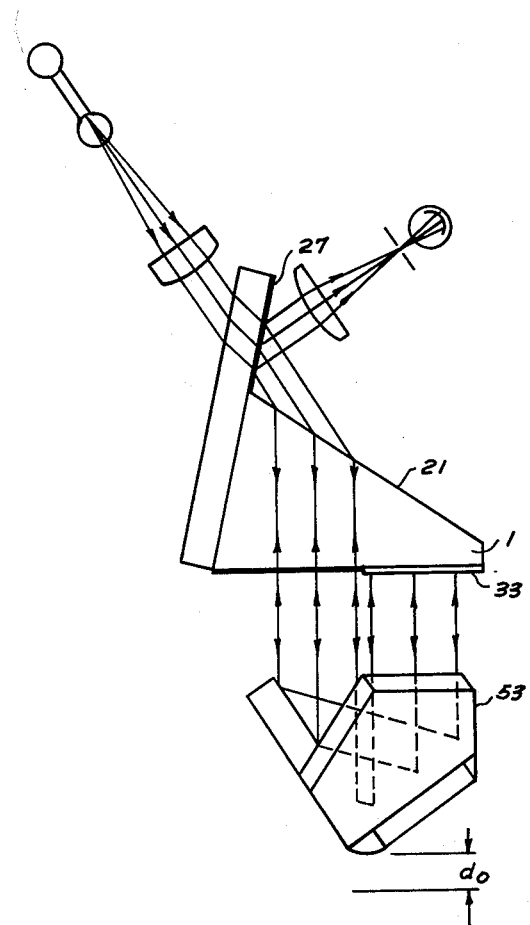
Figure 4B:
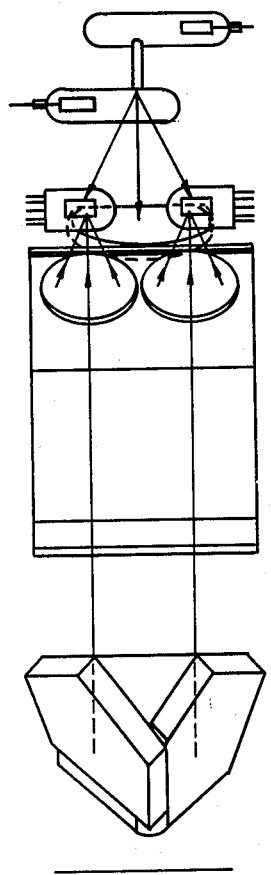
Figures 6A, 6B:
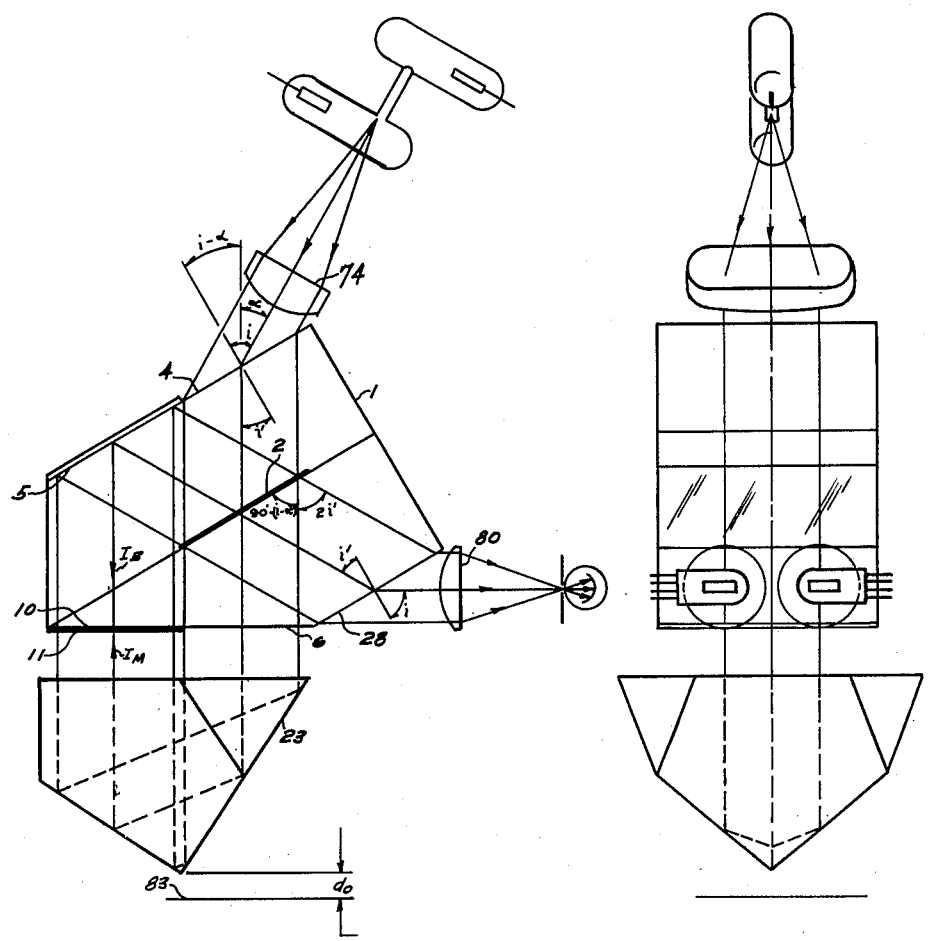
Figure 7A:
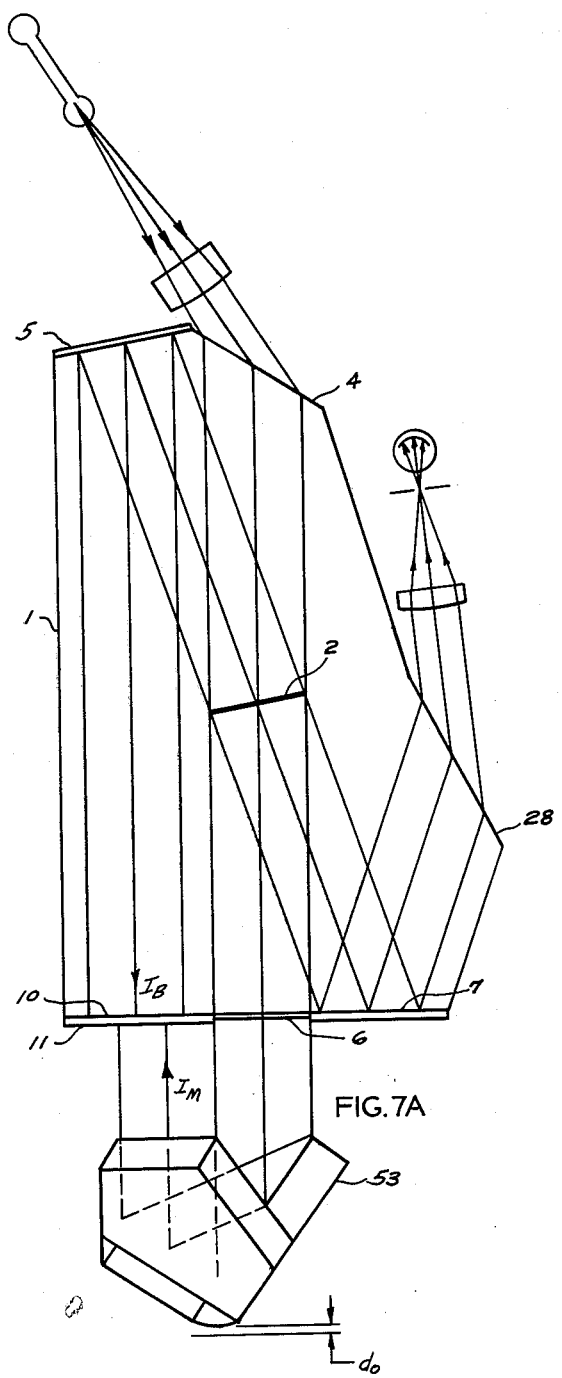
Figure 7B:
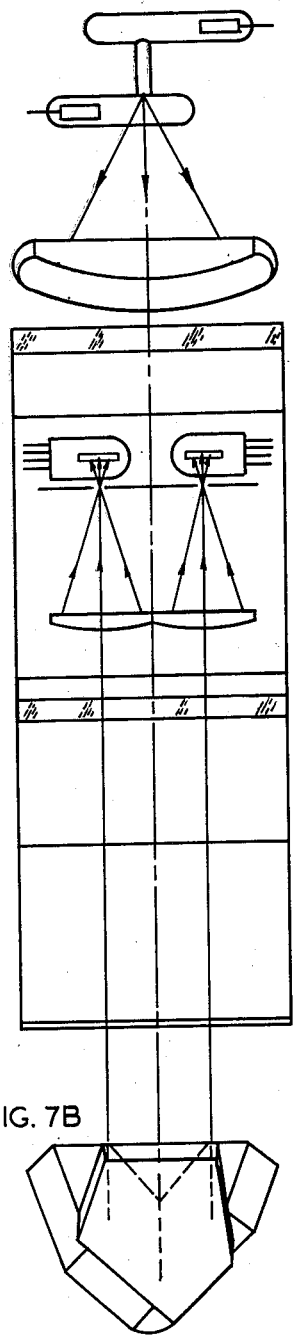
Figure 8A:
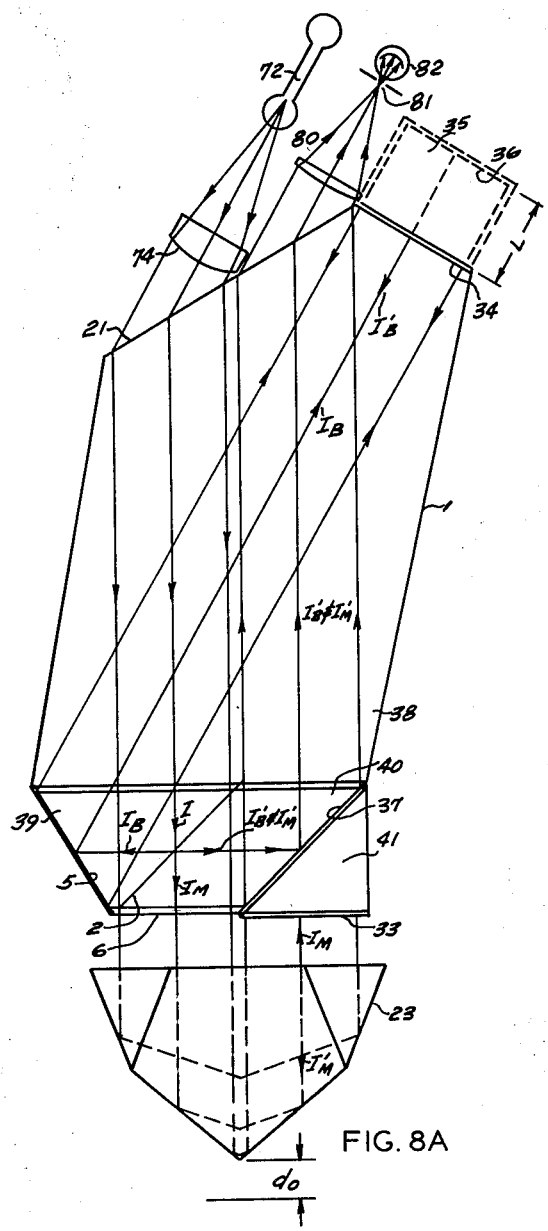
Figure 8B:
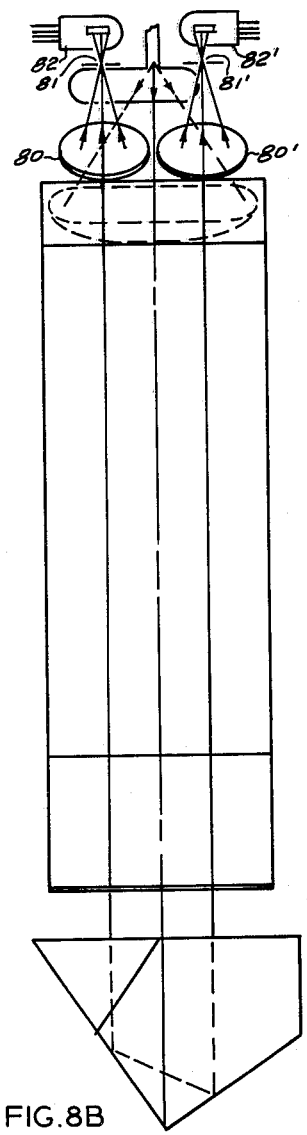

The second improvement may be used without the first as illustrated in FIGURE 4. Parts C and D of this figure are Optical Tunnel Diagrams that show the dispersing and refracting surfaces.

Both improvements may be used in conjunction with each other as shown in FIGURES 5-8. Each of these four figures shows a particular embodiment of this invention, but the scope of this invention is not to be construed as being limited to those configurations shown herein.

Figure 2B:
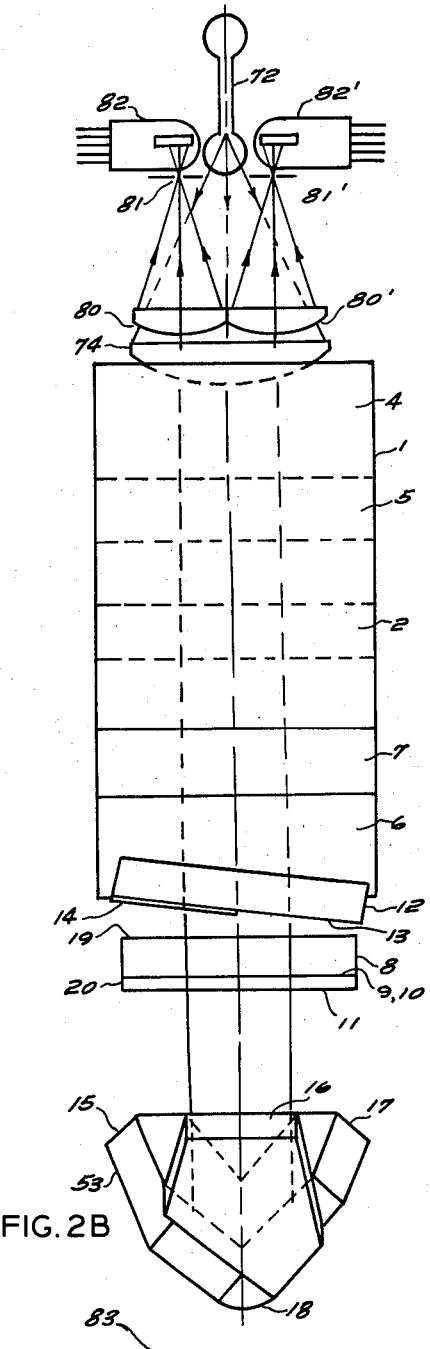

The general method of operation is like that of application Serial No. 769,736 as far as the following accessories are concerned: light source 72, collimating lens 74, retroreflector 53, stigmating lens 80, pinhole 81, photomultiplier 82, and reference surface 83. As shown in FIGURE 2b, there are two each of the stigmating lens 80 and 80', pinhole 81 and 81', and photomultiplier 82 and 82', so that the syncopated signals may be counted independently to provide for bi-directional counting. All of these items are also shown in FIGURES 4 through 8, though not labeled. In all embodiments of this invention the distance $d_0$ normal to the reference plane 83 is measurable by counting the interference fringes as the retroreflector 53 moves from its position of contact with reference plane 83. Retroreflector 53 may consist of a rigid assembly of front surface mirrors 15, 16 and 17 as shown in FIGURE 2. Alternatively the retroreflector may be a cube corner prism as shown in FIGURE 5, labeled 23. Other forms of retroreflector as illustrated in application Serial No. 769,736 may be used in any of the configurations of this invention. Each of these has an optical symmetry center 84.

In all configurations of this invention the retroreflector is the only moving optical element; and the direction of the central order of interference is completely independent of the translational and rotational position of the retroreflector, for the same reason as stated in application Serial No. 769,736, namely the angle between the two interfering split beams is independent of the position of the retroreflector, and the line joining the apex of the retroreflector with the image of this apex as formed by the end reflector 11 is always normal to the end reflector 11 (which is adjusted and locked parallel to the reference surface 83). As in application Serial No. 769,736, the order of interference can be made to be substantially constant, for each fixed value of $d_0$ regardless of lateral displacement of retroreflector 53 and regardless of rotation of retroreflector 53 about any axis that passes through the center of the spherical contact tip 18.

The discussion up to this point has merely pointed out similarities between this invention and the predecessor invention. The differences will now be stated and explained.

As shown in FIGURE 2 the beamsplitter component 1 contains the partial reflecting beamsplitter 2 on a part of interface 3. Incident radiation I enters component 1 through surface 4 that is substantially parallel to beamsplitter 2. Upon encountering beamsplitter 2, incident radiation I is split into reflected radiation $I_B$ and transmitted radiation $I_M$. Radiation $I_B$ is incident upon and reflected by the mirror 5 coated upon a part of surface 4, and after this reflection, the radiation $I_B$ is substantially parallel to the incident radiation I in component 1, and also substantially parallel to the transmitted radiation $I_M$ in component 1. Both radiations $I_B$ and $I_M$ are directed downward to the lower surface 6 of component 1, this surface 6 being substantially parallel to beamsplitter 2 and upper surface 4. Both radiations $I_B$ and $I_M$ emerge through surface 6 from component 1 in directions that are substantially parallel to each other and to the direction of the incident radiation I before it entered component 1 through surface 4. This situation is true regardless of small finite movements of component 1 in any direction and regardless of small finite rotations of component 1 about any axis with respect to radiation source 72 and collimator lens 74.

After emerging through surface 6 from component 1, radiation $I_B$ enters plate 8 through surface 19 and is incident substantially normally upon mirror 10 coated upon a part of surface 9 of plate 8. The mirror 10 is the upper reflecting face of the bifacial reflector 20. Mirror 11 is the lower reflecting face of the bifacial reflector 20 and is substantially parallel to mirror 10, in accordance with the definition of a bifacial reflector.

Radiation $I_B$ is reflected back upon itself as radiation $I_B'$ by mirror 10, re-enters component 1 through surface 6, is reflected by mirror 5 down to the upper side of beamsplitter 2 which partially transmits radiation $I_B'$ and partially reflects it back to the source 72. We are not concerned with the part that returns to the source. The part of $I_B'$ that is transmitted through beamsplitter 2 is incident upon mirror 7 coated upon a part of surface 6, is reflected by mirror 7 and emerges as one of the two split interfering beams through surface 4 from component 1.

The path of the other split beam will now be explained. After emerging through surface 6 from component 1, radiation $I_M$ enters retardation plate 12 which introduces a phase difference of substantially $\lambda/8$ over one part of the transmitted beam $I_M$ with respect to another part of beam $I_M$ each time the radiation passes through retardation plate 12. It is to be noted that beam $I_M$ passes through retardation plate 12 twice, once going down and once going back up, so the total phase difference introduced between the two parts of beam $I_M'$ (the returning beam) is substantially $\lambda/4$ as is required for the accurate bi-directional counting of fringes. This phase retardation is produced by the dielectric layer 14 coated upon a part of surface 13.

Between the first and second passages of radiation $I_M$ through retardation plate 12, this radiation $I_M$ is transmitted through a clear portion of plate 8 down to retroreflector 53 which retroreflects radiation $I_M$ back up to plate 8, but laterally displaced so that it is incident (substantially normal) upon mirror 11 which reflects radiation $I_M$ back upon itself as radiation $I_M'$. Thence radiation $I_M'$ is retroreflected by retroreflector 53 back up through the clear portion of plate 8 and up through retardation plate 12, re-entering component 1 through surface 6, passing up to the lower side of beamsplitter 2 which partially reflects radiation $I_M'$ and partially transmits it back to the source 72. We are not concerned with the part that returns to the source. The part of $I_M$ that is reflected by beamsplitter 2 is incident upon mirror 7 which reflects it up to surface 4 of component 1 from which it emerges as the other one of the two split interfering beams.

Both split interfering beams $I_B'$ and $I_M'$ are substantially parallel as they enter stigmating lens 80. Accordingly, pinhole 81, located at the focal point of stigmating lens 80, transmits both interfering split beams to photomultiplier 82. Note that only a part of split beam $I_M'$ is phase retarded by retardation plate 12, this part entering stigmating lens 80, pinhole 81 and photomultiplier 82. The unretarded part of split beam $I_M'$ enters stigmating lens 80', pinhole 81' and photomultiplier 82'. Also note that isophase parts of split beam $I_B'$ enter each of the two stigmating lenses 80 and 80', pinholes 81 and 81', and photomultipliers 82 and 82'. This is the usual arrangement for bi-directional fringe counting.

It is not essential that plate 8 and retardation plate 12 have accurately parallel optical faces. It is essential that beamsplitter 2 and mirror 5 have substantially parallel faces if the configuration of FIGURE 2 is to have the same beneficial properties as the predecessor invention.

Retardation plate 12 is shown tilted in FIGURE 2. As the tilt angle is changed the magnitude of retardation is changed. The thickness of the phase retardation layer 14 can be established with a tolerance so that the specified retardation of $\lambda/8$ (for each pass) can be realized by making a suitable tilt adjustment of the retardation plate 12 as a part of the assembly operation. This tilt adjustment is not critical.

Component 1 may be assembled from two parts cut from a single parallel plate. Beamsplitter 2 can be coated before interface 3 is cemented.

In FIGURE 3 part A of the retroreflector 53 is imaged at 53' and the end reflector 11 is imaged at 11'. In Part B the optical system is laid out so the light (or other radiation) travels to the right from the source to the detector. This is done in the customary Optical Tunnel Diagram manner by replacing all reflecting plane surfaces by transmitting surfaces with equivalent optical path throughout. In Part B only the Optical Tunnel Diagram for the split beam $I_M/I_M'$ is shown, with the beamsplitter labeled T and R for transmission and reflection, respectively. In Part C the corresponding Optical Tunnel Diagram is shown for the other split beam $I_B/I_B'$.

In Parts B and C the split beams travel equal horizontal distances in equal times for the part of their paths that are in air. The air-equivalent path of the glass component 1 is greater than the actual path traversed because of the value of its refractive index. In Part D the Optical Tunnel Diagram of Part B is redrawn with the air-equivalent paths shown. In Part E the Optical Tunnel Diagram of Part C is redrawn also with the air-equivalent paths shown. Now in Parts D and E the split beams travel equal horizontal distances in equal times for all parts of their paths, so that (as shown) there is an equal distance between the source and the detector for split beam $I_M'$ of Part D and split beam $I_B'$ of Part E, this representing the zero order of interference ($m=0$).

Part E shows the reference arm of the interferometer, which is a constant length. Part D shows the measuring arm of the interferometer, which in this invention may be either longer or shorter than the reference arm. Part F shows how the measuring arm may be made a minimum length and Part G shows how the measuring arm may be made considerably longer than the reference arm. The resulting fringe count will be a measure of the distance between the end reflector image 11' and the optical symmetry center image 84' (fixed with respect to the retroreflector and the contact tip).

To those skilled in the art, FIGURE 3 also makes it clear why the order of interference $m$ is independent of any lateral displacement of the retroreflector or any rotation of it about an axis that passes through the optical symmetry center.

The second improvement of this invention is shown in FIGURE 4. Parts A and B show two views of a particular embodiment of this improvement. Parts C and D are Optical Tunnel Diagrams for this embodiment. Whereas in FIGURES 1 and 2 the interference filter 76 provides for the isolation of the spectral line that is to be used in measurement, the second improvement eliminates the separate dispersing element and replaces it by a refracting surface 21 that is integral with the beamsplitting component 1. The auxiliary beamsplitter 77 of FIGURE 1 has been replaced by the auxiliary beamsplitter 27 shown in FIGURE 4 mounted directly on component 1. The retardation plate 12 of FIGURE 2 has been omitted from FIGURE 4. In order to produce the desired retardation, this retardation plate could be inserted between mirror 33 and retroreflector 53. Alternatively mirror 33 may have coated over a part of its aperture a transparent retardation layer, or mirror 33 may be stepped so that a portion of its surface is closer to retroreflector 53 by a distance that is substantially $\lambda/8$. Any of these three techniques for introducing phase retardation may be used on the embodiments illustrated in FIGURES 4 through 8 or other embodiments.

As shown in Parts C and D, equal dispersion is produced in both the reference arm of the interferometer and the measuring arm of the interferometer. It is also clear from Parts C and D that with improvement (1) only, the order of interference can never become zero nor less than a positive value $m_{\min}$. Further explanation of FIGURE 4 is not necessary to those skilled in the art.

In FIGURE 5 is shown an embodiment of this invention incorporating both improvements. In this embodiment component 1 contains beamsplitter 2 imbedded in the interface as in FIGURE 2. Radiation from the source is incident substantially normally on entrance face 4 of component 1. Whereas in FIGURE 2 the reference beam $I_B$ emerged from component 1 before being reflected at the upper bifacial reflector surface 10, in the embodiment shown in FIGURE 5 the reference beam $I_B$ is reflected from the beamsplitter 2 up to the mirror 5 and then down to the upper bifacial reflector surface 10 which is coated directly on surface 6 of component 1. The measuring beam that is transmitted by the beamsplitter 2 emerges from the exit face 6 of component 1 and proceeds by way of retroreflector 23 to the lower bifacial reflector surface 11. After the interfering beams have recombined at the beamsplitter 2, they follow substantially parallel paths obliquely down to surface 6 on which they are incident at an angle exceeding the critical angle of total internal reflection, and are there reflected obliquely upward to the refracting surface 28 which, like surface 21 of FIGURE 4, is an integral part of component 1 and produces dispersion of both interfering beams. An auxiliary dispersing prism 29 is included to supplement the dispersion introduced by the refracting surface 28 and also to direct the path of the interfering split beams upward so that the optical axes of the collimating lens 74 and the stigmating lens 80 may be substantially parallel for convenience. If the auxiliary dispersing prism 29 is used at substantially minimum deviation, then its orientation is not critical.

With the embodiment illustrated in FIGURE 5, it is apparent that both improvements of this invention have been incorporated in a single embodiment of this invention. While the embodiment shown in FIGURE 5 may be used as a pattern for making component 1, it should be understood that variations in angles and dimensions may be made within the scope of this invention.

The embodiment of this invention shown in FIGURE 6 provides for dispersion at two refracting surfaces 4 and 28 of component 1. The angle of incidence $i$, the angle of refraction $i'$, the tilt angle $\alpha$ of the collimating lens 74, the prism angle $(i-\alpha)$ of component 1, and other angles associated with beamsplitter 2 and the rays incident thereon, are identified in FIGURE 6. The configuration shown corresponds to a tilt angle of $\alpha=30°$ and a refractive index of $n=1.732$ for the component 1, so that the optical axis of stigmator lens 80 is substantially parallel to the exit face 6 and the reference surface 83. As was the case in the embodiment of FIGURE 5, the bifacial reflector 10/11 is coated upon the exit face 6 of component 1, and the beamsplitter 2 is imbedded in the interface of component 1. As was the case in the embodiment of FIGURE 2, the mirror 5 is coated upon a portion of the entrance face surface 4.

The embodiment of this invention shown in FIGURE 7 represents one method of implementing a considerably longer fixed path for the reference beam $I_B$. As in FIGURE 6, this embodiment also provides for dispersion at two refracting surfaces 4 and 28 of component 1. Mirrors 5 and 7 are similar in function to the corresponding mirrors of FIGURE 2. It should be noted that the lateral displacement of the reference beam $I_B$ from the measuring beam $I_M$, as they are incident on opposite sides of the bifacial reflector 10/11, is inconsequential to the beneficial properties of this interferometer invention. This may be readily understood by noting that such a lateral shift may be increased or decreased by moving retroreflector 53 laterally to the right or left, respectively, without affecting the fringe count.

The embodiment of this invention shown in FIGURE 8 represents a second method of implementing a considerably longer fixed path for the reference beam $I_B$, so that higher maximum orders of interference may be realized at large values of $d_0$. As in FIGURE 4, this embodiment provides for dispersion at a single refracting surface 21. This embodiment is, however, different from all of the others shown in FIGURES 2 through 7 in an important respect, namely it has no bifacial reflector as defined in application Serial No. 769,736. As shown in FIGURE 2, a bifacial reflector 20 serves as end reflector for both the reference beam $I_B$ (side 10) and the measuring beam $I_M$ (side 11) in all previously discussed embodiments of both this invention and the predecessor invention. In FIGURE 8 the end reflector for the reference beam $I_B$ is mirror 34 in the upper right corner of component 1; the end reflector for the measuring beam $I_M$ is mirror 33 coated upon the lower surface 6 of component 1. In this case component 1 has two reflecting surfaces imbedded in interfaces. One method of fabricating component 1 is to make the four sub-components 38, 39, 40, 41; coat the beamsplitter 2 on sub-component 39 and coat the mirror 37 on sub-component 40; cement together all of the sub-components 38, 39, 40, 41 of component 1; finish surface 6 on sub-components 40 and 41 after cementing; and coat mirrors 33 and 34. Because this embodiment is different in its end reflector arrangement, the path of the interfering split beams will be traced. The incident beam I is split at beamsplitter 2 into the reference beam $I_B$ and the measuring beam $I_M$. The measuring beam $I_M$ emerges through exit face 6 from component 1, is retro-reflected upward and displaced laterally by retroreflector 23, and is incident substantially normally upon end reflector mirror 33, retraces its path as beam $I_M'$ to beamsplitter 2 which reflects the useful part of $I_M'$ to mirror 37 which reflects $I_M'$ up to the exit portion of the refracting face 21 where additional dispersion occurs, and the measuring beam $I_M'$ enters the detector to interfere there with the reference beam $I_B'$ in the usual manner. The reference beam $I_B$, after being split from the incident beam I at beamsplitter 2, is reflected obliquely upward by mirror 5, is incident substantially normally upon end reflector mirror 34, retraces its path as beam $I_B'$ to beam-splitter 2 which transmits the useful part of $I_B'$ to mirror 37 which reflects $I_B'$ up to the exit portion of the refracting face 21 where additional dispersion occurs, and the reference beam $I_B'$ enters the detector to interfere there with the measuring beams $I_M'$ in the usual manner. With this configuration of component 1 it is possible to increase the length of the reference arm of the interferometer even further by cementing onto sub-component 38 the path lengthener sub-component 35; in this case the end reflector mirror 34 is not coated onto sub-component 38, in its place is the end reflector mirror 36 coated upon the upper one of the two substantially parallel surfaces of sub-component 35. In this manner the length in glass of the reference arm of the interferometer may be lengthened by 2L, where L is the length of the path lengthener 35. Such an arrangement provides for the custom tailoring of component 1 to fit the particular path length ranges of the measuring arm of the interferometer. With the arrangement of FIGURE 8, the following adjustments should be made in assembly: (1) source 72 and collimating lens 74 should be adjusted so that reference beam $I_B$ is incident substantially normally upon end reflector mirror 34 (or 36) for the measuring wavelength; (2) stigmating lenses 80 and 80', pinholes 81 and 81' and photomultipliers 82 and 82' should be adjusted so that reference beam $I_B'$ (after reflection from mirror 34 or 36) enters the center of the pinholes 81 and 81' for the measuring wavelength. If the component 1 has been made with sufficiently accurate angles between its reflecting surfaces, then the measuring beam will also be in adjustment. It may be advisable to provide a cementing jig to control these angles during assembly of component 1. In particular, a control of the wedge angle of the cement layer between sub-components 40 and 41 can provide the necessary two degrees of freedom required to insure sufficiently accurate parallelism between the interfering beams $I_B'$ and $I_M'$.

The major advantages of this invention over the predecessor invention are two: (1) greatly increased range of measurement and (2) fewer components for producing the required dispersion.

Some alternate methods of construction are shown in FIGURES 2, 4, 5, 6, 7, and 8.

The present invention may be used to test the aberrations of a test retroreflector. If in FIG. 8 the exit pinhole 81 and the photomultiplier 82 are removed and the eye of an observer is put in their place, the interference pattern may be observed. If the system is free from aberrations the field of view will be uniformly bright. If, now, the good retroreflector 23 is replaced by an imperfect one, its aberrations will be evident in the resulting interference pattern. The analysis of the aberrations from the observed interference pattern is well known in the art. In the present set-up the interference pattern for a given test retroreflector will be similar to that observed if the same test retroreflector were tested in the usual method in a Twyman-Green interferometer. The advantage of the present invention in this case is the ease of set-up and the elimination of coarse and fine angle adjustments of the end reflectors.

The present invention may also be used to test the aberrations of a parallel plate. The test parallel plate is inserted into the beam between the retroreflector 23 and the end reflector 33, taking care not to intercept rays which have not reached the retroreflector. The observed interference pattern may be analyzed by the usual method to determine the aberrations.

The present invention may also be used to measure very accurately the deviation angle of an optical wedge. The test wedge is inserted into the beam as in the case of the test parallel plate above. If the deviation angle is not more than a few seconds of arc, the observed interference pattern of parallel fringes may be analyzed by the usual method to determine the deviation angle. If the deviation angle is larger, a pair of calibrated Risley prisms may be used in series with the test wedge to compensate the deviation as in the "Interferometer Optical System" of Harold S. Hemstreet and Robert A. Woodson filed in the U.S. Patent Office as application No. 661,540 on May 24, 1957 now U.S. Patent No. 3,072,011, and assigned to the same assignee as the present invention.

It will thus be seen that the objects set forth above, among those made apparent from the preceding description, are efficiently attained, and since certain changes may be made in the above constructions without departing from the scope of the invention, it is intended that all matter contained in the above description or shown in the accompanying drawings shall be interpreted as illustrative and not in a limiting sense.

Having described my invention, what I claim as new and desire to secure by Letters Patent is:

1. An interferometer system comprising a beamsplitter assembly for splitting an incident beam into a first beam and a second beam that is substantially parallel to said first beam, said beamsplitter assembly comprising a beamsplitter embedded in an interface of a substantially parallel plate which interface is substantially parallel to a first face of said parallel plate, a first mirror disposed over a portion of said first face, said beamsplitter transmitting said second beam to a second face of said parallel plate whence it emerges, and reflecting said first beam to said first mirror which reflects it to said second face of said parallel plate whence it emerges substantially parallel to said emergent second beam, a bifacial reflector positioned to receive on one of its faces at substantially normal incidence said emergent first beam, and a retroreflector positioned to receive said emergent second beam and to retroreflect it to the second face of the bifacial reflector at substantially normal incidence.

2. An interferometer system as recited in claim 1 including a separate plate having an aperture and bearing a phase retarding coating over a portion of said aperture, said plate being adjustably mounted in the path of one of the emergent beams to introduce a predetermined phase shift for reversible fringe counting.

3. An interferometer system comprising a reference assembly for splitting an incident beam into a measuring beam and a reference beam and for transmitting said reference beam internally over a substantially constant finite optical path length as measured between beam splitting and beam recombining, collimating means and stigmating means mounted in fixed spatial relation to said reference assembly, and a retroreflector external to said reference assembly, said reference assembly further comprises integral dispersing means to disperse all beams between the said collimating means and the said stigmating means, wherein said reference assembly is a prismatic member comprising an interface substantially parallel to a first exterior face, a beamsplitter over a portion of said interface, a mirror disposed over a portion of said parallel first interior face, a second exterior face disposed adjacent to the first exterior face and forming an angle with that face, said second exterior face being disposed to receive said incident beam from said collimating means at substantially normal incidence, a third exterior face substantially parallel to said second exterior face, a bifacial reflector over a portion of said third exterior face to receive at substantially normal incidence said reference beam after it has been reflected by said mirror on said first exterior face, said retroreflector movably positioned to receive said measuring beam whose optical path length is under test and to retroreflect it at substantially normal incidence onto the opposite side of the bifacial reflector.

4. An interferometer system comprising a reference assembly for splitting an incident beam into a measuring beam and a reference beam and for transmitting said reference beam internally over a substantially constant finite optical path length as measured between beam splitting and beam recombining, collimating means and stigmating means mounted in fixed spatial relation to said reference assembly, and a retroreflector external to said reference assembly, said reference assembly further comprises integral dispersing means to disperse all beams between the said collimating means and the said stigmating means, wherein the reference assembly is a prismatic member comprising an interface substantially parallel to a first exterior face, a second exterior face that is substantially parallel to the first exterior face, a third exterior face adjacent to the second exterior face and forming an angle with that face, a beamsplitter disposed over a portion of said interface for reflecting said reference beam to a mirror coated over a portion of said first exterior face, a bifacial reflector, said mirror being disposed to reflect said reference beam onto said bifacial reflector at substantially normal incidence, said bifacial reflector being located on a portion of said third exterior face, said beamsplitter being adapted to transmit said measuring beam onto a second portion of said third exterior face at substantially normal incidence, said retroreflector positioned to receive said measuring beam and retroreflect it to the other side of said bifacial reflector at substantially normal incidence, said dispersion means being disposed to intercept the incident beam at the first exterior face and the recombined reference and measuring beams at the second exterior face.

5. An interferometer system comprising a reference assembly for splitting an incident beam into a measuring beam and a reference beam and for transmitting said reference beam internally over a substantially constant finite optical path length as measured between beam splitting and beam recombining, collimating means and stigmating means mounted in fixed spatial relation to said reference assembly, and a retroreflector external to said reference assembly, said reference assembly further comprises integral dispersing means to disperse all beams between the said collimating means and the said stigmating means, wherein said reference assembly is a prismatic member comprising an interface substantially parallel to a first exterior face, a second exterior face disposed adjacent to the first exterior face forming an angle with that face, said second exterior face receiving said incident beam from said collimating means at a substantial angle of incidence to introduce dispersion, a beamsplitter disposed over a portion of said interface for reflecting said reference beam to a mirror coated over said first exterior face, a bifacial reflector, said mirror disposed to reflect said reference beam onto said bifacial reflector at substantially normal incidence, said bifacial reflector being located on a portion of a third exterior face, said beamsplitter transmitting said measuring beam onto a second portion of said third exterior face at substantially normal incidence, said retroreflector positioned to receive the measuring beam and retroreflect it to the other side of said bifacial reflector at substantially normal incidence, said prismatic member having a mirror over a third portion of said third exterior face and having a fourth exterior face positioned to receive and further disperse the reference and measuring beams after they have been recombined at the beamsplitter and after they have been reflected by said mirror on said third portion of said third exterior face.

6. An interferometer system comprising a reference assembly for splitting an incident beam into a measuring beam and a reference beam and for transmitting said reference beam internally over a substantially constant finite optical path length as measured between beam splitting and beam recombining, collimating means and stigmating means mounted in fixed spatial relation to said reference assembly, and a retroreflector external to said reference assembly, said reference assembly further comprises integral dispersing means to disperse all beams between the said collimating means and the said stigmating means, wherein said reference assembly is a prismatic member comprising a first exterior face for receiving through a portion thereof said incident beam from said collimating means at a substantial angle of incidence to introduce dispersion, a second exterior face substantially normal to the incident beam after it has entered the prismatic member, a beamsplitter imbedded in the prismatic member, said beamsplitter transmitting the measuring beam so that it is incident substantially normally on said second exterior face through a portion of which the measuring beam passes to said retroreflector positioned to receive the measuring beam and retroreflect it onto a first mirror at substantially normal incidence, said first mirror being located on a second portion of said second exterior face, said beamsplitter reflecting said reference beam, said reference beam being further reflected by a plurality or reflectors including an end reflector, said plurality of reflectors being mounted in fixed rigid spatial relationship to the beamsplitter, after said plurality of further reflections the reference beam is transmitted by the beamsplitter and proceeds substantially parallel to the returning measuring beam after the measuring beam has been reflected by the beamsplitter, said recombined reference and measuring beams being further dispersed as they emerge through a second portion of said first exterior face.

7. An interferometer system as recited in claim 6, including means for lengthening the optical path of the reference beam as measured between beamsplitting and beam recombining, said means comprising path lengthener means rigidly attached to said prismatic member in place of the end reflector thereof, said path lengthener having its own end reflector disposed to reflect the reference beam back to the beamsplitter.

(References on following page)

References Cited in the file of this patent

UNITED STATES PATENTS

| | | |
|---|---|---|
| 1,252,512 | Twyman et al. | Jan. 8, 1918 |
| 1,709,809 | Rashevsky | Apr. 16, 1929 |
| 1,824,668 | Hasselkus et al. | Sept. 22, 1931 |
| 1,901,632 | Chamberlain | Mar. 14, 1933 |
| 2,583,596 | Root | Jan. 29, 1952 |
| 2,795,991 | Tuzi | June 18, 1957 |
| 2,841,049 | Scott | July 1, 1958 |

OTHER REFERENCES

Morgan: Introduction to Geometrical and Physical Optics, published by McGraw-Hill Book Co., Inc., 1953, pp. 223–227.

Kinder, German application 1,022,032, printed Jan. 2, 1958 (Kl 42h 34/11).

Horn, German application 1,030,059, printed May 14, 1958 (Kl 42h 34/11).